United States Patent [19]

Sterzel et al.

[11] 4,235,844

[45] Nov. 25, 1980

[54] PROCESS AND APPARATUS FOR THE MANUFACTURE OF LINEAR HIGH MOLECULAR WEIGHT POLYESTERS

[75] Inventors: Hans-Josef Sterzel, Dannstadt-Schauernheim; Kasimir Von Dziembowski; Hans Pirzer, both of Frankenthal, all of Fed. Rep. of Germany

[73] Assignee: BASF Aktiengesellschaft, Fed. Rep. of Germany

[21] Appl. No.: 24,298

[22] Filed: Mar. 27, 1979

Related U.S. Application Data

[62] Division of Ser. No. 932,632, Aug. 10, 1978.

[30] Foreign Application Priority Data

Aug. 24, 1977 [DE] Fed. Rep. of Germany ....... 2738093
Jan. 27, 1978 [DE] Fed. Rep. of Germany ....... 2803530

[51] Int. Cl.$^3$ .................... B01D 1/22; F28F 13/08; C08G 63/00
[52] U.S. Cl. .................. 422/138; 159/13 B; 165/146; 165/147; 261/112; 261/153; 422/200
[58] Field of Search .............. 422/138, 173, 200, 201, 422/146; 165/146, 147; 159/13 B, DIG. 10, DIG. 11; 261/112, 153

[56] References Cited

U.S. PATENT DOCUMENTS

| | | | |
|---|---|---|---|
| 401,685 | 4/1889 | Canfield | 165/147 |
| 1,200,996 | 10/1916 | Soderlund et al. | 159/13 B |
| 1,327,599 | 1/1920 | Hunt et al. | 261/153 |
| 1,793,174 | 2/1931 | Hofmeister et al. | 159/13 B |
| 1,866,193 | 7/1932 | Coutant | 261/112 |
| 2,689,839 | 9/1954 | Heckert | 159/DIG. 10 |
| 2,994,724 | 8/1961 | Hillard, Jr. et al. | 165/147 |
| 3,551,097 | 12/1970 | Brooks et al. | 422/201 X |

Primary Examiner—Michael S. Marcus
Attorney, Agent, or Firm—Keil & Witherspoon

[57] ABSTRACT

A process for the manufacture of high molecular weight linear polyesters which are derived from dicarboxylic acids or their ester-forming derivatives and from diols, by condensing polyester precondensates, having a relative viscosity of at least 1.05, at from 270° to 340° C. under reduced pressure, the condensation being started at from 290° to 340° C. and the temperature being lowered as the condensation progresses, the final temperature being at least 10° C. above the melting point of the particular polyester produced, and an apparatus for carrying out the process.

3 Claims, 1 Drawing Figure

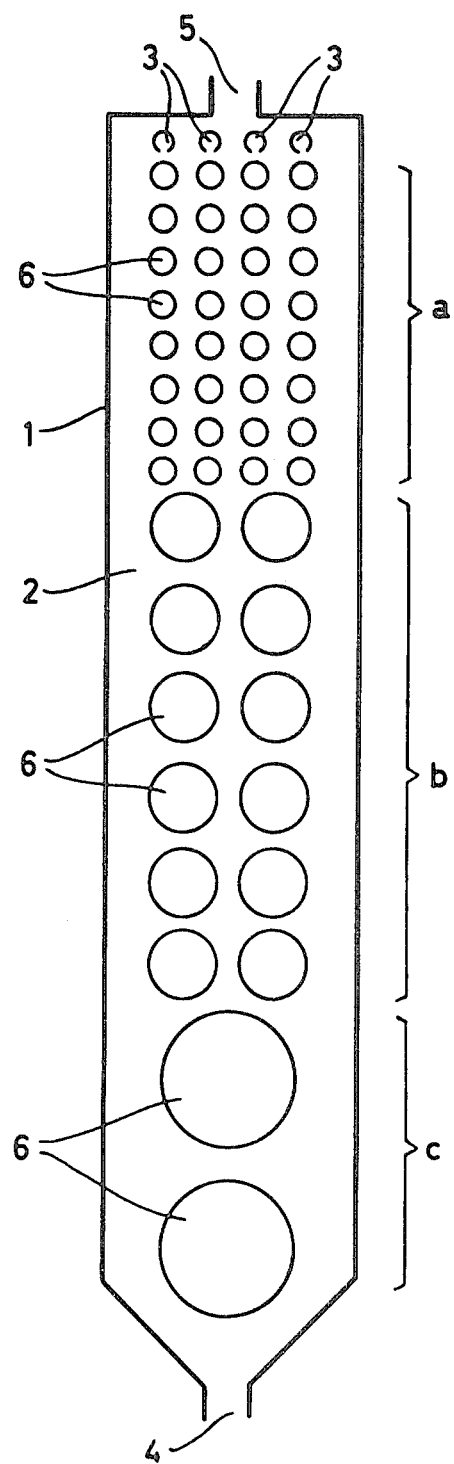

PROCESS AND APPARATUS FOR THE MANUFACTURE OF LINEAR HIGH MOLECULAR WEIGHT POLYESTERS

This is a division of application Ser. No. 932,632, filed Aug. 10, 1978.

The present invention relates to a process for the manufacture of high molecular weight linear polyesters which are derived from dicarboxylic acids or their ester-forming derivatives and from diols, by condensing polyester precondensates, having a relative viscosity of at least 1.05, at from 270° to 340° C. under reduced pressure.

In the manufacture of high molecular weight linear polyesters, low molecular weight precondensates having a low viscosity are converted into high molecular weight condensates at from 260° to 300° C. under reduced pressure, diols being eliminated. However, polyester melts are unstable at the high temperatures required, and this instability results in an increased content of carboxyl end groups. In the process disclosed in German Published Application DAS No. 1,745,541, the polyester precondensate is passed through a horizontal apparatus sub-divided into chambers, the melt being brought into the shape of a thin film in each chamber. This process has the disadvantage that it requires substantial time, eg. several hours, and that the more highly condensed melt formed in the film is continuously recycled to the bottom of the reactor containing material of lower molecular weight. Further, German Laid-Open Application DOS No. 1,959,455 discloses a process in which the condensing melt is passed over a series of superposed zones, circulates in each zone and in doing so comes into intermittent contact with the heating surface, and flows from zone to zone under gravity, forming a film. The process has the disadvantage that dead spaces develop within the individual zones and lead to back-mixing. Further, the process has the disadvantage that in the case of particularly sensitive polyesters the condensation time is still too long. The process known from French Pat. No. 1,545,487, in which the condensing melt is passed over a plurality of rotating inclined surfaces, still requires a condensation time of about 30 minutes. It is noteworthy that in all the processes the temperature is either kept constant or is increased with increasing viscosity.

It is an object of the present invention to effect the condensation reaction, in the manufacture of high molecular weight linear polyesters, in such a way as to require minimum time and as to give a very low content of carboxyl end groups even in the case of sensitive polyesters.

We have found that this object is achieved by a process for the manufacture of high molecular weight linear polyesters, derived from dicarboxylic acids or their ester-forming derivatives and from diols, by condensing polyester precondensates, having a relative viscosity of at least 1.05, at from 270° to 340° C. under reduced pressure, the condensation being started at from 290° to 340° C. and the temperature being lowered as the condensation progresses, the final temperature being at least 10° C. above the melting point of the particular polyester produced.

The invention further relates to an apparatus for the manufacture of high molecular weight linear polyesters, characterized by a vertical tunnel (1), forming a common vapor space (2), with feed points for the polyester precondensate (3), a discharge orifice at the lower end (4), a vapor outlet at the upper end (5), and heated tubes (6) arranged horizontally and parallel to one another, these tubes being so arranged below one another that the melt which flows downward under gravity in each case flows over the next-lower tube, the diameter of the tubes increasing in the downward direction.

The novel process has the advantage that the condensation takes place more rapidly than in conventional processes. Further, it has the advantage that even in the case of sensitive polyesters, eg. polybutylene terephthalate, very low carboxyl end group contents are achieved. The novel apparatus has the advantage that back-mixing is avoided and that there are no moving parts which may cause breakdowns.

The novel process is noteworthy in that the condensation is carried out at progressively decreasing temperature. In view of German Laid-Open Application DOS No. 1,920,954 and French Pat. No. 1,545,487 it was to be expected that short residence times would only be achieved by increasing the temperature.

The high molecular weight linear polyesters, like the polyester precondensates, are derived from dicarboxylic acids or their polyester-forming derivatives, eg. alkyl esters.

Aliphatic and/or aromatic dicarboxylic acids having a molecular weight of $<390$ are preferred. Particularly preferred dicarboxylic acids have—apart from the carboxyl group—a hydrocarbon structure. Alkanedicarboxylic acids of 5 to 10 carbon atoms, and benzenedicarboxylic acids or naphthalenedicarboxylic acids, but especially those derived from benzene, are industrially particularly important. Terephthalic acid should be singled out particularly. Examples of suitable starting materials are glutaric acid, adipic acid, sebacic acid, terephthalic acid, isophthalic acid, succinic acid, naphthalene-2,6-dicarboxylic acid, 4,4'-diphenyldicarboxylic acid, 4,4'-diphenoxydicarboxylic acid and their alkyl esters, alkyl being of 1 to 4 carbon atoms.

Preferred diols are aliphatic, cycloaliphatic and aromatic diols having a molecular weight of $<280$. They preferably have—apart from the hydroxyl groups—a hydrocarbon structure. Alkanediols, especially those of 2 to 6 carbon atoms, are industrially particularly important. Examples of suitable diols are ethylene glycol, propylene glycol, 1,4-butanediol, 1,6-hexanediol, 1,5-pentanediol, decamethylene glycol, neopentylglycol and 1,4-bis-hydroxymethylcyclohexane. Ethylene glycol and 1,4-butanediol have become particularly important.

Preferred polyesters and their precondensates comprise at least 50 mole % of ethylene terephthalate or butylene terephthalate units.

The remainder may consist of other short-chain polyester units derived from the above polyester-forming starting materials. Polyesters which comprise from 70 to 100 mole % of ethylene terephthalate or butylene terephthalate units are particularly preferred.

The process of the invention is particularly important for the manufacture of polybutylene terephthalate.

The polyester precondensates are obtained in the conventional manner by reacting dicarboxylic acids or their esters with a diol in the presence of a catalyst, eg. a titanic acid ester or antimony, manganese or zinc compound, eg. a salt of these elements with a fatty acid, at from 150° to 260° C. The resulting di(glycol) esters of carboxylic acids are precondensed under reduced pressure at from 230° to 270° C. The resulting precondensates have a relative viscosity of at least 1.05 (measured on an 0.5 percent strength by weight solution in a mixture of phenol and o-dichlorobenzene in the weight ratio of 3:2 at 25° C.). As a rule, the polyester precondensates used as the starting materials have a relative viscosity of from 1.05 to 1.2. The manufacture of such precondensates is described in, for example, German Laid-Open Application DOS No. 2,514,116.

The polyester precondensates are condensed to give high molecular weight polyesters at from 270° to 340° C., under reduced pressure, advantageously at from 0.1 to 2 mm Hg. Of course, the diols eliminated during the condensation are continuously removed from the reaction mixture.

It is an essential characteristic of the invention that the condensation is started at from 290° to 340° C. and the temperature is lowered as the condensation progresses, the final temperature being at least 10° C., advantageously 30° C., above the melting point of the particular polyester produced. The starting temperature also depends on the nature of the precondensate. In the case of polyethylene terephthalate, starting temperatures of from 320° to 340° C. have proved particularly advantageous, whilst for polybutylene terephthalate the corresponding figures are from 290° to 310° C. Advantageously, the high starting temperature is lowered by from 30 to 50° C. during the condensation. This lowering may be continuous but is preferably stepwise. The final temperature depends essentially on the melting point of the polyester produced and should be sufficiently above the melting point for solidification to be prevented and there being no interference with subsequent processing. As a rule, we have found that temperatures of about 10° C. above the melting point can be used.

The process according to the invention may also be carried out advantageously by lowering the temperature during condensation continuously by from 30° to 50° C., by carrying out the process adiabatically.

This procedure has the advantage that the optimum reaction temperature is obtained substantially automatically. The novel process has the further advantage that it can be carried out in conventional condensation reactors, with an optimum temperature-time profile, if such reactors are fitted with a heat exchanger upstream from the condensation stage of the polyester condensation.

To start with, the low-viscosity polyester precondensate melt is heated, before entering the polycondensation zone, to from 30° to 50° C. above the temperature which the polyester obtained after the polycondensation has finished is to exhibit. Advantageously, the temperature of the polyester precondensate is initially raised by the same amount as it falls during the subsequent polycondensation. The heating of the polyester precondensate melt is advantageously carried out rapidly, in a heat exchanger, for example a tube exchanger or plate exchanger, or in some similar suitable apparatus.

After the polyester precondensate melt which has been heated in this way has entered the condensation zone, the condensation starts as a consequence of transesterification reactions. The heat energy required for the reaction and for the evaporation of the diol liberated, and of any by-products, eg. tetrahydrofuran in the case of the condensation of polyesters containing, 1,4-butanediol, is abstracted from the heat content of the melt. As a result, the temperature drops as the condensation reaction progresses, so that the optimum reaction temperature results substantially automatically. Accordingly, the surfaces in the polycondensation zone, which come into contact with the melt, are also kept at the temperature which the polyester is to exhibit after polycondensation and which may be up to 10° C. below the final temperature of the polycondensation reaction. As a result, toward the end of the polycondensation the melt is at the temperature which corresponds to that of the surfaces which are in contact with the melt or which may be from 5° to 10° C. above this value, depending on the construction of the apparatus used, due to absorption of mechanical energy during agitation of the melt.

The condensation is preferably carried out in a thin layer, which for the purposes of the invention means a layer of not more than 7 mm. Advantageously, the thin layers are in contact with heated surfaces so as to ensure rapid heat transfer and rapid adaptation to the decreasing condensation temperature. For this reason, it has proved advantageous to allow the condensing melt to flow as a thin layer, under gravity, over a substantially vertical indirectly heated surface. In order to achieve a graduated reaction temperature from the top of the reactor to the bottom, it has proved particularly advantageous to allow the condensing melt to flow in a thin layer, under gravity, over a plurality of indirectly heated surfaces, a film being formed as the material flows from one surface to the next. The number of surfaces required depends on the details of the apparatus. A suitable apparatus, for example, is that described in French Pat. No. 1,545,487, provided the inclined surfaces are heated. Another suitable apparatus will be explained below.

FIG. 1 shows a cross-section through the apparatus according to the invention for the manufacture of linear high molecular weight polyesters. The apparatus consists of a substantially vertical tunnel (1), which may be of round or polygonal section. Advantageously, the tunnel tapers at the bottom, so as to allow the melt to accumulate. The tunnel forms a common vapor space (2). As a result, a uniform pressure is maintained at all points of the condensation over the entire condensation sequence. The diols eliminated are removed through the vapor outlet (5) at the upper end of the tunnel. The appropriate vapor separators and the corresponding vacuum equipment is not shown. An orifice (4) for discharging the polyester melt is provided at the bottom end of the tunnel, the polyester being discharged by means of gear pumps or extruders, not shown in the drawing. Heated tubes (6) are arranged horizontally, and parallel to one another, in the tunnel. The tubes are arranged below one another so that the melt which flows downward under gravity in each case flows over the next-lower tube, the diameter of the tubes increasing in the downward direction of the tunnel. The polyester precondensate is introduced through the feed point (3) in such a way that the melt is applied over the entire length of the tubes of the uppermost layer.

Over the length of the tunnel, the tubes are advantageously sub-divided into groups, the uppermost group consisting of tubes of the smallest diameter. Each group can consist of several layers of tubes. Advantageously, the tubes in the individual groups are arranged one below the other. The number of tubes and of layers depends on the dimensions of the particular apparatus used. In the next group, the tubes are advantageously again arranged in individual layers, one below the other. Advantageously, the tube diameter increases by a factor of from 2.0 to 4.0 from each group to the next.

Further, it has proved advantageous if the tubes of each successive group are arranged staggered relative to the tubes of the group above. As a result, the melt flowing down from two tubes of group a impinges on one tube of group b. The melt flowing down from two tubes of group b then impinges on one tube of group c. As a result of the plurality of tubes, the decrease in temperature in the downward direction of the tunnel can easily be brought about, for example from group to group, or with further sub-division within a group.

The polyesters obtainable by the process of the invention may be used for the manufacture of shaped articles, eg. filaments, films or injection-molded or extruded objects, and also for the production of coatings.

The Examples which follow illustrate the process of the invention.

EXAMPLES (a) Manufacture of the polyester precondensate 1,000 g of dimethyl terephthalate and 685 g of 1,4-butanediol are heated to 130° C. in a 2 liter round flask equipped with a stirrer, nitrogen inlet and packed column. At this temperature, 1.5 g of tetrabutyl orthotitanate, to act as the trans-esterification catalyst, were added, whilst stirring. The distillation of methanol soon started. The temperature was raised to 220° C. in the course of 2 hours, after which 330 g of methanol had distilled off and the trans-esterification reaction had ended. The packed column was now replaced by a descending condenser and the temperature was raised to 250° C. over 15 minutes. The pressure was then lowered steadily and linearly to 10 mm Hg over 40 minutes, with rapid stirring. The mixture was then stirred for a further 5 minutes at this pressure, after which the precondensation was terminated by cracking the vacuum with nitrogen.

The precondensate was poured, under nitrogen, into a dish, where it solidified rapidly. The relative viscosity of this precondensate was 1.13.

(b) Condensation

The condensation was carried out in a 250 ml round flask equipped with a stirrer, condenser and nitrogen inlet, and heated by a bath of Wood's metal. For the post-condensation, 50 g of the precondensate were fused under nitrogen at the selected post-condensation temperature. After the material had melted and the temperature had reached equilibrium, the pressure in the flask was rapidly reduced to about 0.5 mm Hg. The speed of stirring was chosen to suit the particular viscosity. After a predetermined time, the post-condensation was stopped by cracking the vacuum with nitrogen.

The results are given in the Table which follows.

| | Temperature [°C.] | Time, min | $\eta_{rel}$ |
|---|---|---|---|
| Comparative examples | | | |
| 1 | 255 | 15 | 1.26 |
| 2 | 270 | 15 | 1.38 |
| 3 | 280 | 15 | 1.44 |
| 4 | 290 | 15 | 1.37 |
| Examples | | | |
| 1 | 295 | 0–2 mins | |
| | 290 | 2–4 mins | |
| | 285 | 4–6 mins | |
| | 280 | 6–8 mins | |
| | 275 | 8–11 mins | |
| | 270 | 11–14 mins | 1.77 |
| 2 | 295 | 0–2 mins | |
| | 290 | 2–4 mins | |
| | 285 | 4–6 mins | |
| | 280 | 6–8 mins | |
| | 275 | 8–10 mins | |
| | 270 | 10–12 mins | 1.67 |

Comparative Examples 1 to 4 to show the relative viscosity as a function of the post-condensation temperature, after a reaction time of 15 minutes. In accordance with the prior art, the temperature was kept constant over the duration of the polycondensation. If the temperature is raised from 255° C. to 280° C., the relative viscosity also increases, as does the degree of polycondensation. On further raising the temperature to 290° C., the relative viscosity again decreases and a yellowish product is obtained.

In contrast, Examples 1 and 2 were carried out by the process according to the invention. For this purpose, the metal bath was preheated to 295° C. and after the precondensate had melted the post-condensation reaction was started. During the latter, the temperature of the heating bath was lowered in the steps shown in the Table. Using the process of the invention, a relative viscosity of 1.67 was reached in the course of 12 minutes (Example 2).

EXAMPLE 3

A. Manufacture of a polybutylene terephthalate precondensate 20 kg of dimethyl terephthalate and 13.7 kg of 1,4-butanediol were heated to 130° C. in a stirred kettle of 40 l capacity, equipped with a stirrer, nitrogen inlet and fractionating column. At this temperature, 30 g of tetrabutyl orthotitanate, to act as the trans-esterification catalyst, were added, whilst stirring. Thereafter, the distillation of methanol commenced. The temperature was raised to 220° C. over 2 hours. After this time, 6.6 kg of methanol had distilled off and the trans-esterification reaction had ended. The temperature was raised to 250° C. over 30 minutes, after which the pressure was reduced steadily and linearly to 10 mm Hg over 45 minutes. At this stage, the relative viscosity of the polybutylene terephthalate precondensate obtained was 1.12.

B. Condensation of the polybutylene terephthalate precondensate by the process of the invention The polybutylene terephthalate precondensate was forced through a plate heat exchanger and thereby heated to 285° C., and was passed into a condensation kettle of 40 liters capacity, preheated to 285° C. with Diphyl vapor. This heating-up required 10 minutes. The flow of Diphyl vapor was then stopped and the pressure in the condensation kettle was abruptly reduced to 1 mm Hg, with rapid stirring.

During the polycondensation which ensued, the temperature of the melt fell exponentially to 250° C. in the course of 33 minutes. From this time onward, the temperature was kept at 250° C. by means of Diphyl vapor. After a further 21 minutes, the vacuum was cracked and the melt was discharged under nitrogen pressure. The relative viscosity of the polybutylene terephthalate produced was 1.72.

COMPARATIVE EXAMPLE 5

In this experiment, the polybutylene terephthalate precondensate was also forced through the plate heat exchanger over 10 minutes, but the temperature was kept at 250° C. The condensation kettle was preheated to 250° C. At this temperature, after the kettle had been filled, the pressure was abruptly reduced to 1 mm Hg whilst stirring rapidly, and the condensation was carried out under these conditions for 54 minutes. After this time, the vacuum was cracked and the melt was discharged. The relative viscosity was only 1.49.

We claim:

1. Apparatus for the manufacture of high molecular weight linear polyesters, comprising:
    (a) means defining a substantially vertical tunnel, the bore of which defines a common vapor space;
    (b) a plurality of groups of horizontal, parallel heated tubes within the bore of said tunnel and spaced from another, wherein each group is comprised of a plurality of layers of tubes with the tubes of each group all having the same diameter, wherein at least one of said groups has a plurality of tubes in each layer;
    (c) feed means disposed above said tubes for introducing polyester precondensate into the bore of the tunnel;
    (d) means defining an orifice for the discharge of formed polyester melt from the apparatus; and
    (e) a vapor outlet; wherein said common vapor space is substantially free from obstructions other than the tubes and wherein the tubes are so arranged below one another that the melt flows under gravity from one tube to the next tube below it, the diameters of the tubes increasing in the downward direction of the tunnel.

2. The apparatus of claim 1, wherein the tube diameter increases by a factor of from 2.0 to 4.0 from each group to the next.

3. The apparatus of claim 1 or 2, wherein, over the length of the tunnel, the tubes of each successive group are arranged staggered relative to the preceding group.

* * * * *